(12) United States Patent
Burangulov

(10) Patent No.: US 11,416,765 B2
(45) Date of Patent: Aug. 16, 2022

(54) METHODS AND SYSTEMS FOR EVALUATING TRAINING OBJECTS BY A MACHINE LEARNING ALGORITHM

(71) Applicant: YANDEX EUROPE AG, Lucerne (CH)

(72) Inventor: Pavel Aleksandrovich Burangulov, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 1226 days.

(21) Appl. No.: 15/892,699

(22) Filed: Feb. 9, 2018

(65) Prior Publication Data

US 2019/0034830 A1   Jan. 31, 2019

(30) Foreign Application Priority Data

Jul. 26, 2017   (RU) .......................... RU2017126674

(51) Int. Cl.
  *G06N 3/08*   (2006.01)
  *G06N 20/00*   (2019.01)
  (Continued)

(52) U.S. Cl.
  CPC ........... *G06N 20/00* (2019.01); *G06F 16/951* (2019.01); *G06F 16/953* (2019.01); *G06F 17/17* (2013.01);
  (Continued)

(58) Field of Classification Search
  CPC .......... G06N 20/00; G06N 5/003; G06N 5/04; G06N 20/20; G06N 5/025; G06F 16/951; G06F 16/953; G06F 17/17; H04L 67/10
  See application file for complete search history.

(56) References Cited

U.S. PATENT DOCUMENTS

| 5,809,490 A | 9/1998 | Guiver et al. |
| 2010/0082697 A1 | 4/2010 | Gupta et al. |

(Continued)

FOREIGN PATENT DOCUMENTS

| GB | 2500303 A | 9/2013 |
| RU | 2580516 C2 | 4/2016 |

(Continued)

OTHER PUBLICATIONS

Search Report with regard to the counterpart RU Application No. 2017126674 completed Aug. 29, 2018.

*Primary Examiner* — Michael J Huntley
*Assistant Examiner* — Sung W Lee
(74) *Attorney, Agent, or Firm* — BCF LLP

(57) ABSTRACT

Methods and systems for training a machine learning algorithm (MLA) comprising: acquiring a first set of training samples having a plurality of features, iteratively training a first predictive model based on the plurality of features and generating a respective first prediction error indicator. Analyzing the respective first prediction error indicator for each iteration to determine an overfitting point, and determining at least one evaluation starting point. Acquiring an indication of a new set of training objects, and iteratively retraining the first predictive model with at least one training object from the at least one evaluation starting point to obtain a plurality of retrained first predictive models and generating a respective retrained prediction error indicator. Based on a plurality of retrained prediction error indicators and a plurality of the associated first prediction error indicators, selecting one of the first set of training samples and the at least one training object.

16 Claims, 6 Drawing Sheets

(51) Int. Cl.
  *G06N 5/04* (2006.01)
  *G06F 17/17* (2006.01)
  *G06F 16/951* (2019.01)
  *G06N 20/20* (2019.01)
  *G06N 5/00* (2006.01)
  *G06F 16/953* (2019.01)
  *H04L 67/10* (2022.01)

(52) U.S. Cl.
  CPC ............... *G06N 5/003* (2013.01); *G06N 5/04* (2013.01); *G06N 20/20* (2019.01); *H04L 67/10* (2013.01)

(56) References Cited

U.S. PATENT DOCUMENTS

| | | | |
|---|---|---|---|
| 2014/0172753 A1* | 6/2014 | Nowozin | ............... G06N 20/00 706/12 |
| 2015/0095272 A1* | 4/2015 | Bilenko | ............... G06K 9/6262 706/12 |
| 2016/0328653 A1* | 11/2016 | Adams | ................... G06N 5/048 |
| 2017/0169340 A1 | 6/2017 | Asente et al. | |

FOREIGN PATENT DOCUMENTS

| | | |
|---|---|---|
| RU | 2607999 C2 | 1/2017 |
| WO | 2012118905 A1 | 9/2012 |
| WO | 2016025396 A1 | 2/2016 |

\* cited by examiner

METHODS AND SYSTEMS FOR EVALUATING TRAINING OBJECTS BY A MACHINE LEARNING ALGORITHM

CROSS-REFERENCE

The present application claims priority to Russian Patent Application No. 2017126674, entitled "Method and Systems for Evaluating Training Objects by a Machine Learning Algorithm," filed Jul. 26, 2017, the entirety of which is incorporated herein by reference.

TECHNICAL FIELD

The present technology relates to machine learning algorithms and more precisely to methods and systems for evaluating training objects by a machine learning algorithm, the training objects including features and training samples.

BACKGROUND

Improvements in computer hardware and technology coupled with the multiplication of connected mobile electronic devices have spiked interest in developing solutions for task automatization, outcome prediction, information classification and learning from experience, resulting in the field of machine learning. Machine learning, closely related to data mining, computational statistics and optimization, explores the study and construction of algorithms that can learn from and make predictions on data.

The field of machine learning has evolved extensively in the last decade, giving rise to self-driving cars, speech recognition, image recognition, personalization, and understanding of the human genome. In addition, machine learning enhances different information retrieval activities, such as document searching, collaborative filtering, sentiment analysis, and so forth.

Machine learning algorithms (MLAs) may generally be divided into broad categories such as supervised learning, unsupervised learning and reinforcement learning. Supervised learning consists of presenting a machine learning algorithm with training data consisting of inputs and outputs labelled by assessors, where the goal is to train the machine learning algorithm such that it learns a general rule for mapping inputs to outputs. Unsupervised learning consists of presenting the machine learning algorithm with unlabeled data, where the goal is for the machine learning algorithm to find a structure or hidden patterns in the data. Reinforcement learning consists of having an algorithm evolving in a dynamic environment without providing the algorithm with labeled data or corrections.

One of the challenges associated with machine learning algorithms in building flexible and reliable predictive models that describe real-world data resides in choosing the right features for the predictive model to consider and the right training data sets to train the predictive model on. Furthermore, building a predictive model may be a computationally expensive and time-consuming task, and a trade-off must often be made between the usage of computing resources and the accuracy of the predictive model.

Once a predictive model is built, another risk is having overfitting, where the predictive model may perform well on a training data set, but may not make accurate predictions on unseen data.

U.S. Patent Publication No. 2014/0172753 titled "Resource allocation for machine learning" by Nowozin et al. teaches resource allocation for machine learning, for selecting between many possible options, for example, as part of an efficient training process for random decision tree training, for selecting which of many families of models best describes data, for selecting which of many features best classifies items. In various examples samples of information about uncertain options are used to score the options. In various examples, confidence intervals are calculated for the scores and used to select one or more of the options. In examples, the scores of the options may be bounded difference statistics which change little as any sample is omitted from the calculation of the score. In an example, random decision tree training is made more efficient whilst retaining accuracy for applications not limited to human body pose detection from depth images.

U.S. Patent Publication No. 2015/0095272 titled "Estimation of predictive accuracy gains from added features" by Bilenko et al. teaches estimating predictive accuracy gain of a potential feature added to a set of features, wherein an existing predictor is trained on the set of features. Outputs of the existing predictor for instances in a dataset can be retrieved from a data store. Moreover, a predictive accuracy gain estimate of a potential feature added to the set of features can be measured as a function of the outputs of the existing predictor for the instances in the dataset. The predictive accuracy gain estimate can be measured without training an updated predictor on the set of features augmented by the potential feature.

U.S. Patent Publication No. 2016/0042292 A1 titled "Automated methodology for inductive bias selection and adaptive ensemble choice to optimize predictive power" by Caplan et al. teaches a computer-implemented method of automating inductive bias selection including a computer receiving a plurality of examples, each example providing a plurality of feature-value pairs. The computer constructs an inductive bias dataset which correlates each respective example in the plurality of examples with numerical indications of training quality. The numerical indications of training quality for each respective example are generated by creating a plurality of models, with each model corresponding to a distinct set of inductive biases. The training quality for each respective model is evaluated when applied to the respective example. The computer uses the inductive bias dataset to select a plurality of inductive biases for application to one or more new datasets.

SUMMARY

Embodiments of the present technology have been developed based on developers' appreciation of at least one technical problem associated with the prior art solutions.

Embodiments of the present technology have been developed based on developers' appreciation that while prior art solutions have been developed to evaluate new features and/or new training data, the presence of overfitting and noise may sometimes give unreliable results.

Furthermore, evaluating the predictive ability or quality of a predictive model trained on a new feature or new training sample at a single overfitting point may not necessarily be indicative of the general predictive ability of the predictive model with the new feature or training sample due to different factors, such as prediction errors, noise, or labelling errors, among others.

Therefore, developer(s) have devised method and systems for evaluating training objects by a machine learning algorithm.

The present technology may allow evaluating the impact of a new feature or new training samples with more sensitivity and/or by using less computational resources, and therefore improve the performance of a machine learning algorithm, thus saving computational resources.

According to a first broad aspect of the present technology, there is provided a computer-implemented method for training a machine learning algorithm (MLA), the MLA executable by a server, the method comprising: acquiring, by the MLA, a first set of training samples, the first set of training samples having a plurality of features, iteratively training, by the MLA, a first predictive model based on at least a portion of the plurality of features, the training including, for each first training iteration: generating a respective first prediction error indicator, the respective first prediction error indicator being at least partially indicative of a prediction error associated with the first predictive model at an associated first training iteration, analyzing, by the MLA, the respective first prediction error indicator for each first training iteration to determine an overfitting point, the overfitting point corresponding to a given first training iteration after which a trend in the first prediction error indicator changes from generally decreasing to generally increasing, determining, by the MLA, at least one evaluation starting point, the at least one evaluation starting point being positioned at a number of iterations before the overfitting point, acquiring, by the MLA, an indication of a new set of training objects, iteratively retraining, by the MLA, the first predictive model being in a respective trained state associated with the at least one evaluation starting point with: at least one training object of the new set of training objects to obtain a plurality of retrained first predictive models, for each one of the plurality of retrained first predictive models: generating a respective retrained prediction error indicator for at least one retraining iteration corresponding to at least one first training iteration, the respective retrained prediction error indicator being at least partially indicative of a prediction error associated with the retrained first predictive model, based on a plurality of retrained prediction error indicators associated with the plurality of retrained first predictive models and a plurality of the associated first prediction error indicators, selecting, by the MLA, one of the first set of training samples and the at least one training object of the new set of training objects.

In some implementations, the new set of training objects is one of a new set of features or a new set of training samples.

In some implementations, the training and the retraining the first predictive model is executed by applying a gradient boosting technique.

In some implementations, selecting, by the MLA, the at least one training object of the new set of training objects comprises comparing the plurality of retrained first predictive model prediction error indicators with the plurality of the associated first prediction error indicators by applying a statistical hypothesis test.

In some implementations, the first prediction error indicator and the respective retrained first predictive model prediction error indicator are one of a mean squared error (MSE) or a mean absolute error (MAE).

In some implementations, the statistical hypothesis test is a Wilcoxon signed-rank test.

In some implementations, the at least one evaluation starting point is a plurality of evaluation starting points.

In some implementations, each one of the plurality of evaluation starting points is associated with a respective plurality of retrained first predictive models.

According to a second broad aspect of the present technology, there is provided a system for training a machine learning algorithm (MLA), the system comprising: a processor, a non-transitory computer-readable medium comprising instructions, the processor, upon executing the instructions, being configured to execute: acquiring, by the MLA, a first set of training samples, the first set of training samples having a plurality of features, iteratively training, by the MLA, a first predictive model based on at least a portion of the plurality of features, the training including, for each first training iteration: generating a respective first prediction error indicator, the respective first prediction error indicator being at least partially indicative of a prediction error associated with the first predictive model at an associated first training iteration, analyzing, by the MLA, the respective first prediction error indicator for each first training iteration to determine an overfitting point, the overfitting point corresponding to a given first training iteration after which a trend in the first prediction error indicator changes from generally decreasing to generally increasing, determining, by the MLA, at least one evaluation starting point, the at least one evaluation starting point being positioned at a number of iterations before the overfitting point, acquiring, by the MLA, an indication of a new set of training objects, iteratively retraining, by the MLA, the first predictive model being in a respective trained state associated with the at least one evaluation starting point with: at least one training object of the new set of training objects to obtain a plurality of retrained first predictive models, for each one of the plurality of retrained first predictive models: generating a respective retrained prediction error indicator for at least one retraining iteration corresponding to at least one first training iteration, the respective retrained prediction error indicator being at least partially indicative of a prediction error associated with the retrained first predictive model, based on a plurality of retrained prediction error indicators associated with the plurality of retrained first predictive models and a plurality of the associated first prediction error indicators, selecting, by the MLA, one of the first set of training samples and the at least one training object of the new set of training objects.

In some implementations, the new set of training objects is one of a new set of features or a new set of training samples.

In some implementations, the training and the retraining the first predictive model is executed by applying a gradient boosting technique.

In some implementations, selecting, by the MLA, the at least one training object of the new set of training objects comprises comparing the plurality of retrained first predictive model prediction error indicators with the plurality of the associated first prediction error indicators by applying a statistical hypothesis test.

In some implementations, the first prediction error indicator and the respective retrained first predictive model prediction error indicator are one of a mean squared error (MSE) or a mean absolute error (MAE).

In some implementations, the statistical hypothesis test is a Wilcoxon signed-rank test.

In some implementations, the at least one evaluation starting point is a plurality of evaluation starting points.

In some implementations, each one of the plurality of evaluation starting points is associated with a respective plurality of retrained first predictive models.

In the context of the present specification, a model or predictive model may refer to a mathematical model generated by a machine learning algorithm that is capable of making predictions based on properties of a training data set.

In the context of the present specification, a training object may refer to a feature or a training sample used by a machine learning algorithm. A feature, also known as variable or attribute, may refer to an individual measurable property of an observation. Features may be represented by feature vectors, a feature vector having a plurality of feature describing an observation. A training sample may refer to labelled data used to discover potentially predictive relationships. Generally, a training sample may be represented as a feature vector having a plurality of features and a label.

In the context of the present specification, unless expressly provided otherwise, an "electronic device", a "user device", a "server", and a "computer-based system" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "computer-readable medium" and "storage" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present detailed description is intended to be only a description of illustrative examples of the present technology. This description is not intended to define the scope nor set forth the bounds of the present technology. In some cases, helpful examples of modifications may be set forth as an aid to understanding the present technology, and not to define the scope or set forth the bounds of the present technology. These modifications are not an exhaustive list and other modifications are likely possible. Further, where this has not been done (i.e. where no examples of modifications have been set forth), it should not be interpreted that no modifications are possible and/or that what is described is the sole manner of implementing that particular aspect of the present technology. In addition it is to be understood that the present detailed description provides in certain instances simple implementations of the present technology, and that where such is the case they have been presented in this manner as an aid to understanding. Various implementations of the present technology may be of a greater complexity.

With these fundamentals in place, we will now consider some non-limiting examples to illustrate various implementations of aspects of the present technology.

Figure 1:
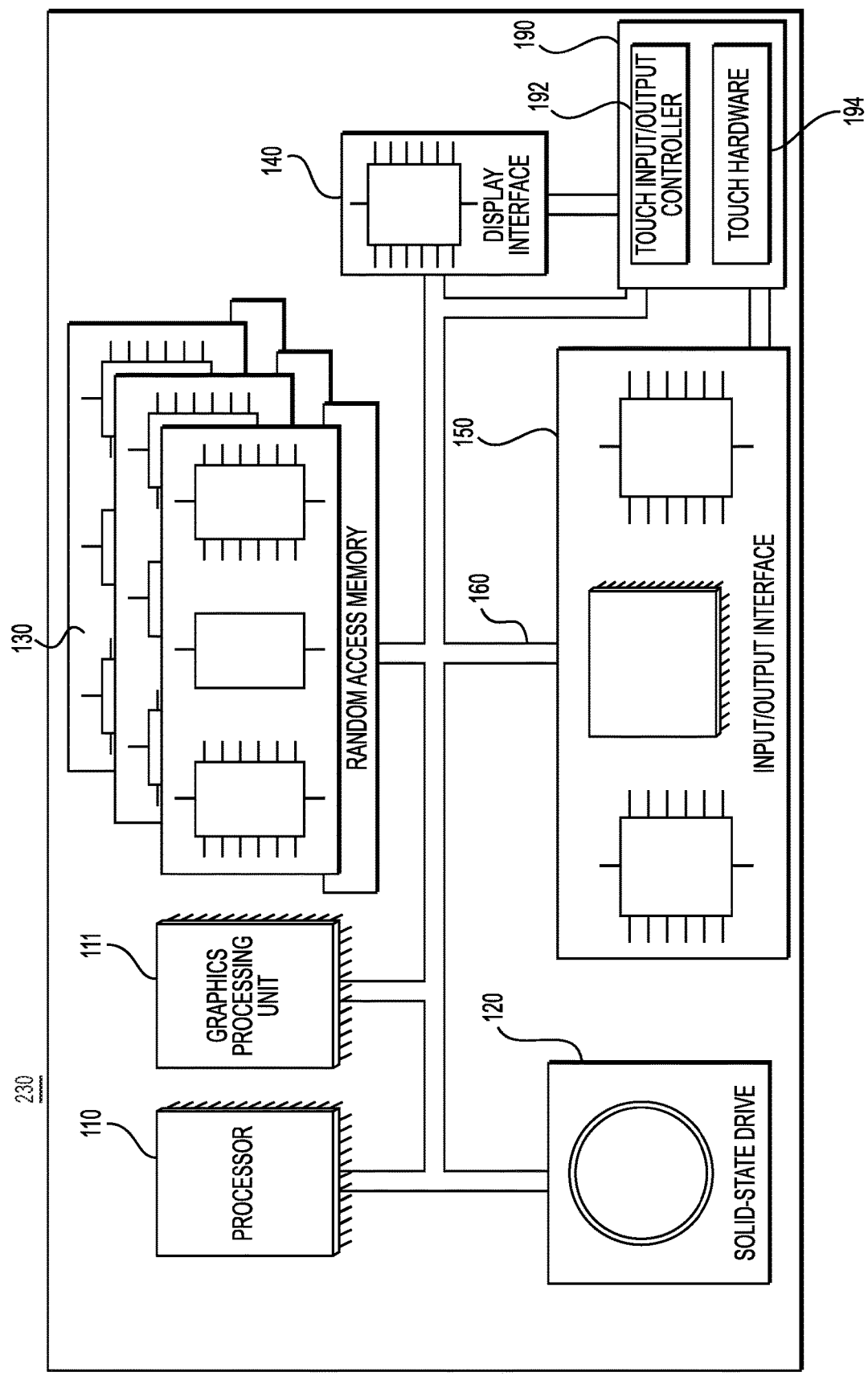
FIG. 1 is a schematic diagram of a non-limiting implementation of a training server with non-limiting embodiments of the present technology.

Referring to FIG. 1, there is shown a training server 230 suitable for use with some implementations of the present technology, the training server 230 comprising various hardware components including one or more single or multi-core processors collectively represented by processor 110, a graphics processing unit (GPU) 111, a solid-state drive 120, a random access memory 130, a display interface 140, and an input/output interface 150.

Communication between the various components of the training server 230 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown), a mouse (not shown) or a trackpad (not shown) allowing the user to interact with the training server 230 in addition or in replacement of the touchscreen 190.

According to implementations of the present technology, the solid-state drive 120 stores program instructions suitable for being loaded into the random access memory 130 and executed by the processor 110 and/or the GPU 111. For example, the program instructions may be part of a library or an application.

The training server 230 may be a server, a desktop computer, a laptop computer, a tablet, a smartphone, a personal digital assistant or any device that may be configured to implement the present technology, as should be understood by a person skilled in the art.

Figure 2:
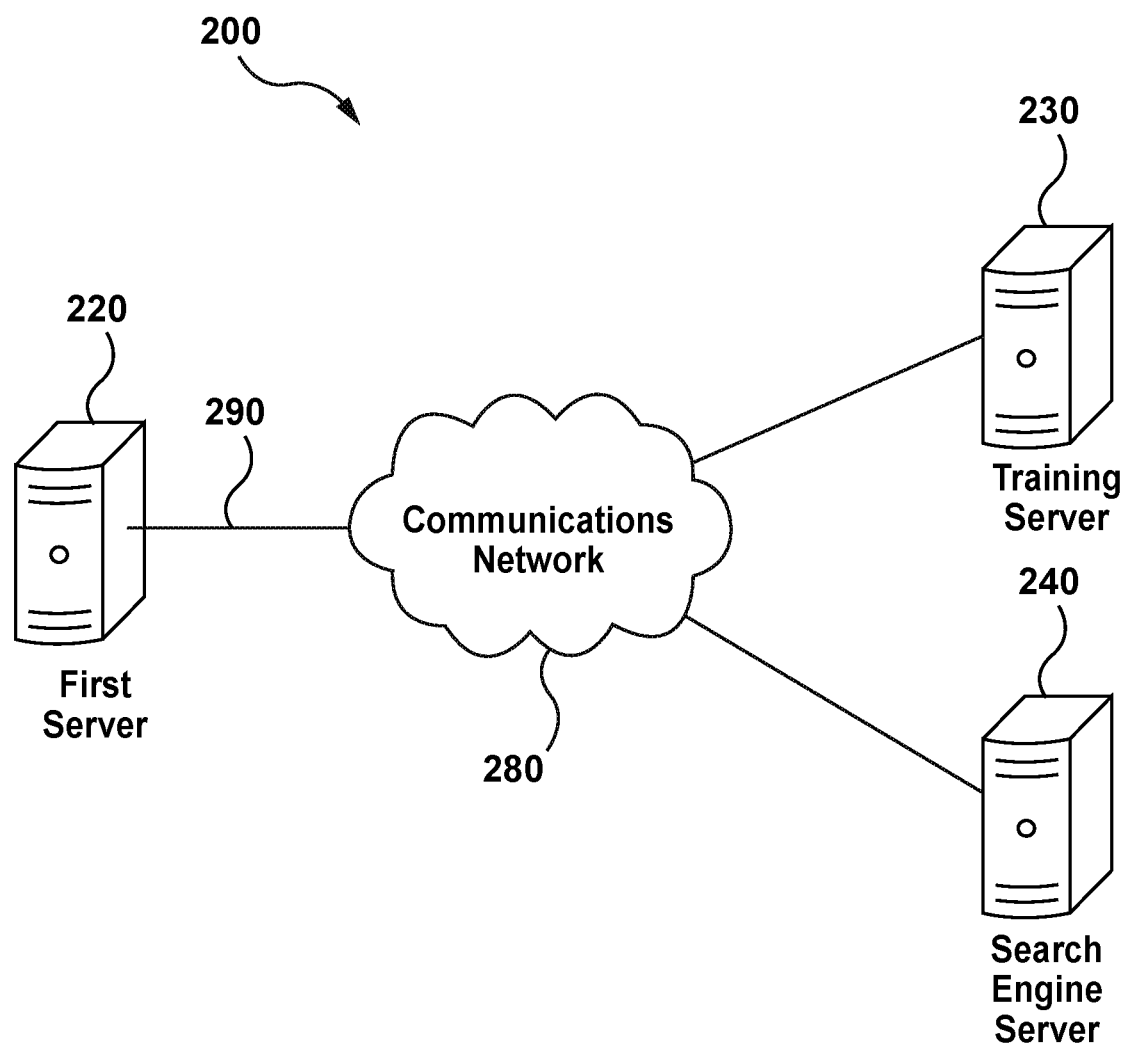
FIG. 2 is schematic diagram of a non-limiting implementation of a communication system in accordance with the present technology.

Now turning to FIG. 2, a communication system 200 is illustrated in accordance with an embodiment of the present technology. The communication system 200 comprises a first server 220, the training server 230, a search engine server 240, a communications network 280 and a communication link 290.

In some non-limiting embodiments of the present technology, the communications network 280 can be implemented as the Internet. In other embodiments of the present technology, the communications network 280 can be implemented differently, such as any wide-area communications network, local-area communications network, a private communications network and the like.

How the communication link 290 is implemented is not particularly limited and will depend on how the first server 220, the training server 230, and the search engine server 240 are implemented.

The first server 220, the training server 230 and the search engine server 240 are coupled to the communications network 280 via their respective communication links 290. The first server 220, the training server 230 and the search engine server 240 can be implemented as conventional computer servers. In an example of an embodiment of the present technology, the first server 220, the training server 230 and the search engine server 240 can be implemented as a Dell™ PowerEdge™ Server running the Microsoft™ Windows Server™ operating system. Needless to say, the first server 220, the training server 230 and the search engine server 240 can be implemented in any other suitable hardware and/or software and/or firmware or a combination thereof.

The first server 220 may be implemented as a machine learning training data repository, where labeled training data may be accumulated over time and saved for training and retraining machine learning algorithms. As an example, the first server 220 may receive or acquire training data directly from the search engine server 240. In other embodiments, the first server 220 may be a public repository of training data, where users may upload labelled training data. As a non-limiting example, the first server 220 may store training samples that may have been previously labelled by human assessors.

The training server 230 may be used to train one or more machine learning algorithms associated with the search engine server 240. As an example, predictive model generated by a machine learning algorithm may be received at predetermined intervals of time from the search engine server 240 and retrained and validated with new training data before being sent back to the search engine server 240.

The search engine server 240 may be implemented as a conventional search engine server using a machine learning algorithm, such as one provided by GOOGLE™ MICROSOFT™, YAHOO™ or YANDEX™. The search engine server 240 may execute a machine learning algorithm to rank search results in response to user queries. The machine learning algorithm may be continuously trained and updated by the training server 230 using training data from the first server 220.

It should be expressly understood that implementations for the first server 220, the training server 230 and the search engine server 240 are provided for illustration purposes only. As such, those skilled in the art will easily appreciate other specific implementational details for the first server 220, the training server 230, the search engine server 240, the communication link 290 and the communications network 280. As such, by no means, examples provided herein above are meant to limit the scope of the present technology.

Figure 3:
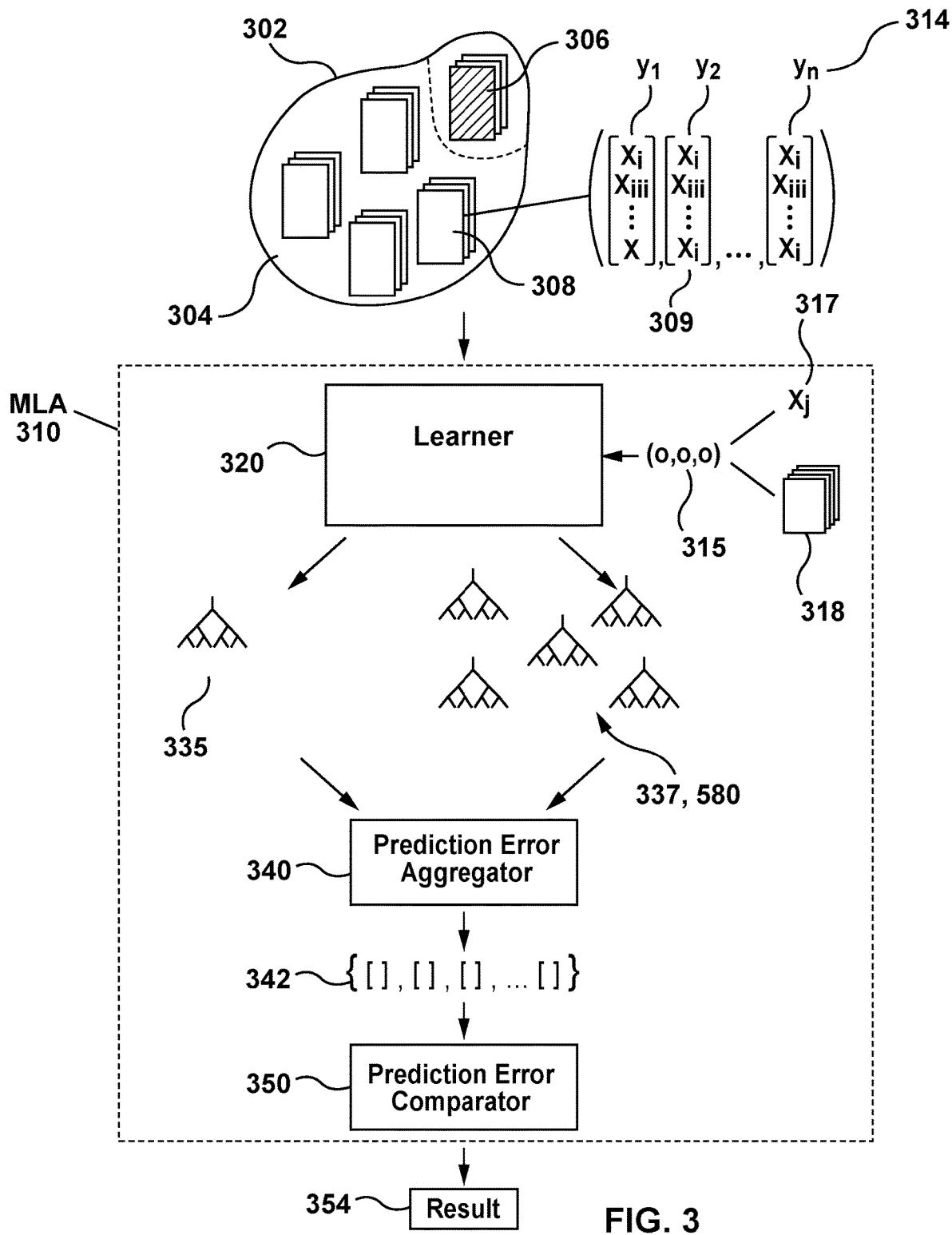
FIG. 3 is an illustration of a machine learning system in accordance with non-limiting embodiments of the present technology.

Now turning to FIG. 3, a machine learning system 300 for evaluating training objects is illustrated in accordance with non-limiting embodiments of the present technology.

The machine learning system 300 includes an MLA 310, the MLA 310 including a learner 320, a prediction error aggregator 340 and a prediction error comparator 350.

The machine learning system 300 may be implemented on the training server 230. In some embodiments, the machine learning system 300 may be distributed across different servers, such as the first server 220 and the search engine server 240.

The MLA 310 may receive as an input a first set of training samples 302 in the learner 320.

The first set of training samples 302 may be acquired from the first server 220 and/or the search engine server 240 via the communications network 280. In other embodiments, the first set of training samples 302 may be acquired from a storage (not depicted) of the training server 230.

The first set of training samples 302 may have a plurality of training samples 308. Generally, a portion 304 of the first set of training samples 302 may be used for training a predictive model, and another portion 306 of the first set of training samples 302 may be used to validate the predictive model by testing its predictive ability. The manner in which the portion 304 and the another portion 306 of the first set of training samples 302 are chosen is not limited, and the portion 304 and the another portion 306 may be chosen dynamically for training and validation. Furthermore, as will be explained below, a cross-validation procedure may be performed on the first set of training samples 302, allowing to partition the first set of training samples 302 into a plurality of portions (not depicted) and use each one of the portions for validation and for testing.

A training sample 308 may be any form of an electronic file or a document that can be stored on a computer readable medium such as, but not limited to, the solid-state drive 120. The implementation of the training sample 308 of the first set of training samples 302 is not limited. The training sample 308 may include any type of media or data, and may be a text file, an HTML page, a PDF document, a formatting information, a metadata, an audio recording, an image or a video recording.

The first set of training samples 302 may have a plurality of features 309 associated therewith, whereby each training sample 308 may be represented by a feature vector 309 (generated on the basis of the plurality of features 309) and an associated label 314. The feature vector 309 may be a list of features, each feature of the feature vector 309 being a measurable property of the training sample 308. The label 314 may correspond to an output of the training sample 308, i.e. a class or a tag that is desirable to know.

As a non-limiting example, in the context of search engine servers (such as search engine server 240) using machine learning algorithms, features vectors may generally be query-independent (i.e. static features), query-dependent (i.e. dynamic features) and query level features. Examples of features include TF, TF-IDF, BM25, IDF sums and lengths of document's zones and document's PageRank, HITS ranks or other variants.

As a non-limiting example, the features of the feature vectors may comprise: popularity of the document, freshness of the document, number of outgoing links, number of incoming links, and length of the document. Each element of the feature vector may be a real value representing the feature. As should be understood, the size of a feature vector is not limited, and may depend on how the search engine server 240 is implemented. As a non-limiting example, the feature vector for each document associated with a query may be a 136-dimensional vector, comprising, for each one of the body, the anchor, the title, the URL, and the whole document: covered query term number, covered query term ratio, stream length, inverse document frequency (IDF), sum of term frequency, max of term frequency, min of term frequency, mean of term frequency, etc.

The learner 320 is configured to receive the first set of training samples 302 as an input to output one or more predictive models, based on each feature vector 309 and label 314 of each training sample 308 of the first set of training samples 302.

The learner 320 may output a predictive model using a gradient boosting technique. Gradient boosting techniques are well known in the art. Briefly speaking, gradient boosting, also known as gradient boosting machines (GBM), is a family of machine learning techniques for regression and classifications problems where a predictive model is built in the form of an ensemble of weak predictive models such as, but not limited to, decision trees.

The main idea of a gradient boosting technique is to add new models to an ensemble in a sequential manner, where a new weak base-learner predictive model is trained at each iteration with respect to the error the whole ensemble learnt so far. In other words, the objective is to have new base-learners that are maximally correlated with the negative gradient of a loss function, associated with the ensemble. Generally, a gradient boosting technique assumes a real-valued training label, and seeks an approximation in the form of a weighted sum of weak prediction models. Examples of loss functions include Gaussian, Laplace, Huber, Quantile loss functions for continuous variables, Binomial and Adaboost for categorical response variables, and other custom loss functions for survival models and data counts.

Non-limiting examples of parameters in gradient boosting include tree-specific parameters (affecting each individual tree in the predictive model), boosting parameters (affect the boosting operation in the predictive model) and miscellaneous parameters (affecting the overall functioning). As a non-limiting example, four parameters may be specified: number of trees, learning rate, maximum tree depth and minimum samples per leaf.

The number of trees may generally be set to be as high as possible (>1000). The learning rate, which scales the effect of each tree on the overall prediction, may be chosen to be small (<0.01). Generally, the maximum tree depth may be between 1 and 10 and the minimum samples per leaf may depend on the size of the first set of training samples 302.

Non-limiting examples of gradient boosting algorithms include AdaBoost, tree-based boosting, stochastic gradient boosting, likelihood-based boosting, GBoost, AdaBoost and Gentle Boost, among others.

In the non-limiting example illustrated herein, based on at least a portion of the feature vector 309 and the label 314 of each training sample 308 of the first set of training samples 302, the learner 320 may generate and output a first predictive model 335 mapping approximately each feature vector 309 to the training label 314. The first predictive model 335 may be a function estimating the dependence between the feature vector 309 and the training label 314 of each training sample 308 such that a loss function is minimized. Broadly speaking, a loss function measures how well a predictive model fits the training data and may generally depend on how the learner 320 is implemented and the type of problem being solved. As a non-limiting example, mean squared error (MSE), mean absolute error (MAE), Huber loss, may be used as loss functions.

The overall gradient boosting procedure in the learner 320 may be performed for a number of M iterations, corresponding to a number of trees in the first predictive model 335, to output the first predictive model 335.

Generally, the first predictive model 335 may be iteratively trained on the portion 304 of the first set of training samples 302 during the training phase and validated on the another portion 306 of the first set of training samples 302 during the validation phase.

Figure 4:
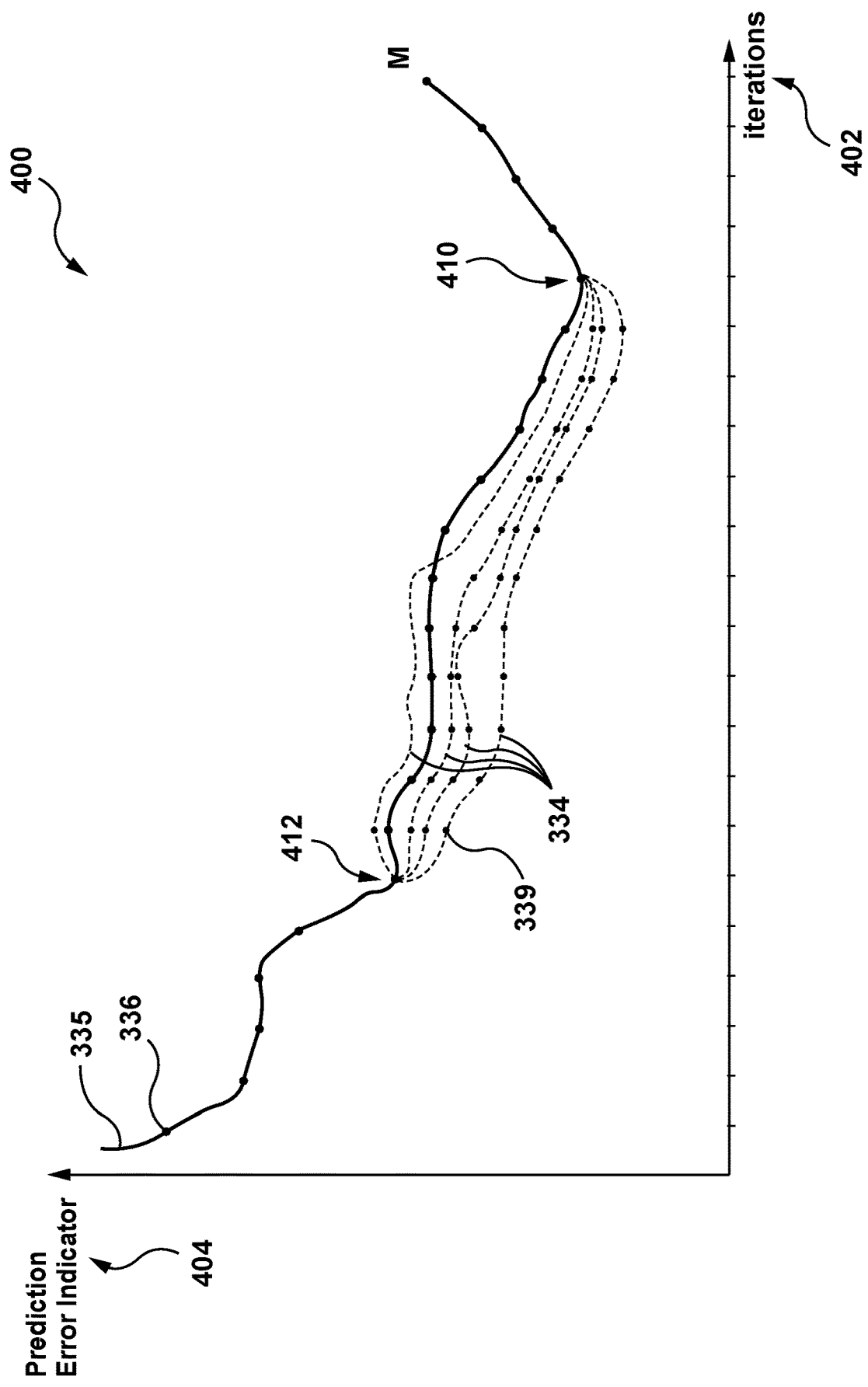
FIG. 4 is an illustration of a first training procedure in accordance with non-limiting embodiments of the present technology.
Figure 5:
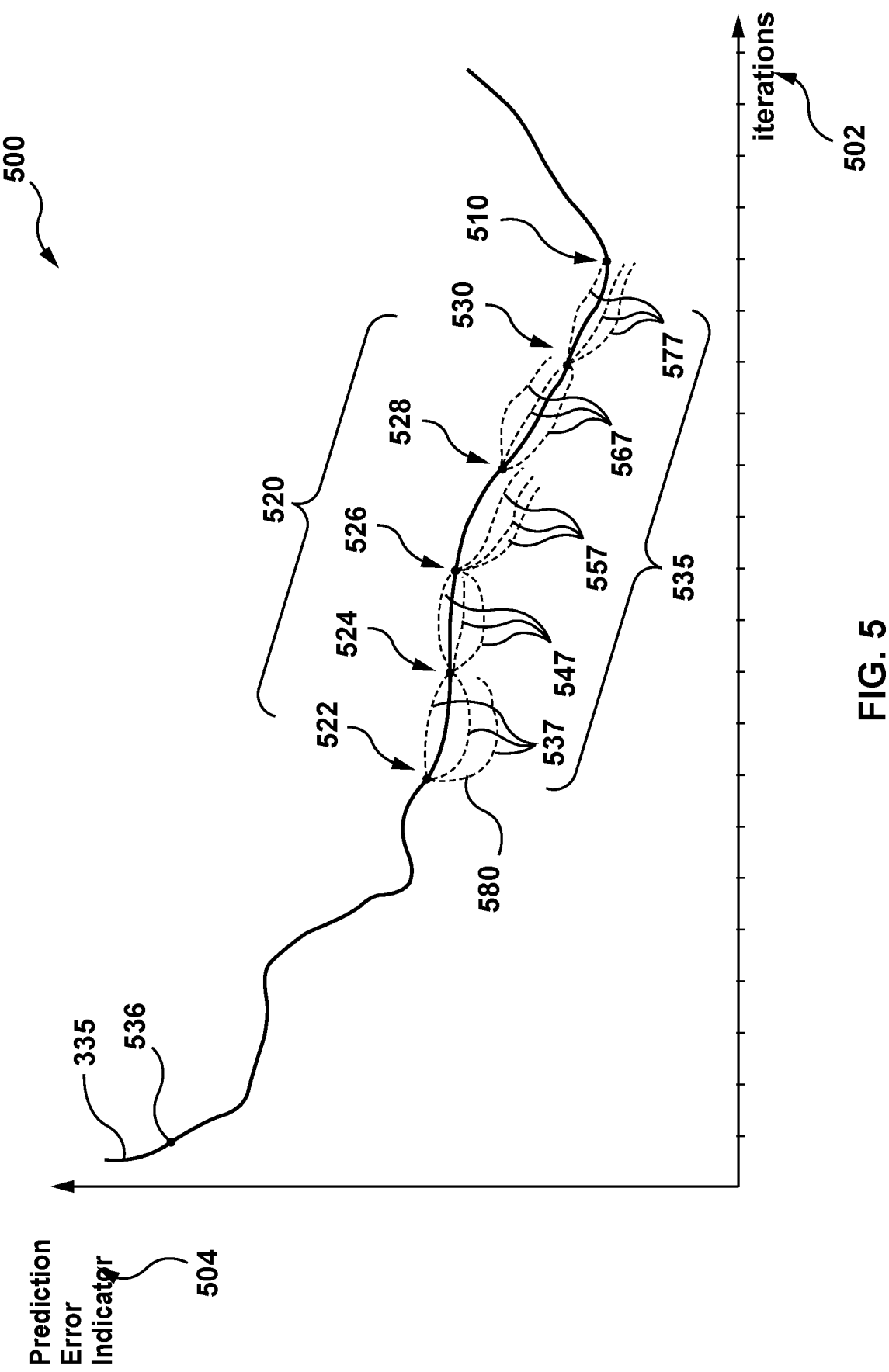
FIG. 5 is an illustration of a second training procedure in accordance with non-limiting embodiments of the present technology.

FIG. 4 and FIG. 5 describe two different training procedures for evaluating a new training object 315.

First, reference is made simultaneously to FIG. 3 and FIG. 4, where a first training procedure 400 implemented by the MLA 310 in the learner 320 in accordance with non-limiting embodiments of the present is illustrated in the form of a plot.

The plot of the first training procedure 400 may have a number of iterations 402 on an independent axis and a prediction error indicator 404 on the dependent axis for the first predictive model 335 and the plurality of retrained predictive models 334.

A respective first prediction error indicator 336, the respective first prediction error indicator 336 being an output of the loss function at a given iteration, may be generated by the learner 320 during the training phase and/or the validation phase, the respective first prediction error indicator 336 being at least partially indicative of a prediction error associated with the first predictive model 335 at the given iteration. How the respective first prediction error indicator 336 is implemented is not limited and depends on how the gradient descent technique of the learner 320 is implemented. In general, the respective prediction error indicator 336 at a given iteration may be based at least in part on the difference between the prediction output value of the first predictive model 335, and the label 314 of each feature vector 309 of each training sample 308. As a non-limiting example, MSE may be used.

Generally, during the training phase and/or the validation phase, the learner 320 may save the state of the first predictive model 335 at each iteration (e.g. in a storage or memory of the training server 230), therefore being able to return to a specific iteration of the training phase and/or the validation phase where the first predictive model 335 is at a corresponding state. In alternative embodiments, the learner 320 may only save the state of the first predictive model 335 at predetermined intervals (e.g. every 2 or 3 iterations).

As stated previously, the learner 320 may stop the training of the first predictive model 335 after M iterations. The learner 320 may analyze each respective first prediction error indicator 336 at an associated iteration to detect an overfitting point 410, the overfitting point 410 corresponding to a given iteration after which a trend in the first prediction error indicator 336 changes from generally decreasing to generally increasing. The overfitting point 410 may indicate that from the given iteration corresponding to the overfitting point 410, the respective first prediction error indicator 336 (corresponding to the MSE) of the first predictive model 335 may start to increase, and the training of the first predictive model 335 should cease.

After having detected the overfitting point 410 based on the first prediction error indicator 336 at the given iteration, the learner 320 may go back by a number of iterations to determine an evaluating starting point 412, the evaluation starting point 412 corresponding to a previous state of the first predictive model 335. The manner in which the evaluating starting point 412 is determined is not limited, and may depend on how the learner 320, the gradient boosting technique and the first predictive model 335 are implemented. Generally, the location of the evaluation starting point 412 may be determined empirically by an operator of the MLA 310 implementing the present technology. However, in other embodiments, the location of the evaluating starting point 412 may be based on the total number of iterations M, on the first prediction error indicator 336 or may be determined in any other suitable manner.

An indication of a new set of training objects 315 may then be received or acquired by the learner 320. The indication of the new set of training objects 315 may be an indication that triggers the learner 320 to include at least one new training object of the new of set of training objects 315 when training the first predictive model 335. As stated previously, the indication of the new training object 315 may be a new feature 317 or a new set of training samples 318.

In embodiments where the indication of the new set training object 315 is an indication of at least one new feature 317, the at least one new feature 317 may already be present in the list of features of each feature vector 309, however the at least one new feature 317 may not have been considered by the learner 320 when training the first predictive model 335. In other embodiments, the new feature 317 may not be included in the plurality of features of each feature vector 309, and may need to be acquired or extracted by the learner 320 by going through a feature extraction routine (not depicted), and may then be added to the each feature vector 309. Generally, a single feature may be added to the first predictive model 335, however, in alternative embodiments, a plurality of features may be added to the first predictive model 335.

The new training object 315 (i.e. the at least one new feature 317 or the new set of training samples 318) may be used to retrain the first predictive model 335 starting from the evaluation starting point 412, where the first predictive model 335 is in a given state. In alternative embodiments, the new training object 315 may be added to the first predictive model 335 starting from the first iteration. The objective may then be to compare the first predictive model 335 with a retrained first predictive model (in the form of a plurality of retrained predictive models 334) retrained on the new training object 315 to see if the addition of the new training object 315 ameliorates the prediction ability of the first predictive model 335, by looking at their respective prediction error indicators.

Beginning at the evaluation starting point 412, where the first predictive model 335 is in a given state, the learner 320 may retrain the first predictive model 335 with the new training object 315 to obtain a plurality of retrained first predictive models 334, all of the plurality of retrained first predictive models 334 starting from the first predictive model 335 being in the same given state. The number of retrained first predictive models 334 may be determined empirically, such that the number of retrained first predictive models 334 is statistically significant, and the results obtained by the retrained first predictive models 334 are not due to noise or other fluctuations. The learner 320 may iteratively retrain the retrained first predictive model 334 to obtain a plurality of retrained first predictive models 334 from the evaluation starting point 412 to the overfitting point 410.

The learner 320 may generate a respective retrained prediction error indicator 339 for each of the plurality of retrained first predictive models 334 at each iteration (corresponding to iterations of the first predictive model 335) starting from the evaluation starting point 412 and going to the overfitting point 410, the respective retrained prediction error indicator 339 being determined in a manner similar to the first prediction error indicator 336, the respective retrained prediction error indicator 339 being at least partially indicative of a prediction error associated with the respective retrained first predictive model of the plurality of retrained first predictive models 334. Generally, each respective retrained prediction error indicator 339 may correspond to a respective first prediction error indicator 336 for a given iteration.

Now referring simultaneously to FIG. 3 and to FIG. 5, a second training procedure 500 in accordance with non-limiting embodiments of the present is illustrated in the form of a plot.

As with the first training procedure 400, the second training procedure 500 may have a number of iterations 502 on an independent axis and a prediction error indicator 504 on the dependent axis for the first predictive model 335 and the plurality of retrained predictive models 535.

The second training procedure 500 may differ from the first training procedure 400 in that instead of having only one evaluation starting point, such as the evaluation starting point 412, in the illustration of FIG. 5, there is a plurality of evaluation starting points 520, the plurality of evaluation starting points including a first evaluation starting point 522, a second evaluation starting point 524, a third evaluation starting point 526, a fourth evaluation starting point 528 and a fifth evaluation starting point 530.

Depending on how the present technology is implemented, the number of the plurality of evaluation starting points 520 may vary. Generally, as with the evaluation starting point 412, the learner 320 may go back by a number of iterations to the first evaluation starting point 522, and subdivide the interval into an equal number of sub-intervals, each sub-interval beginning at a respective iteration corresponding to a respective evaluation starting point and respective state of the first predictive model 335, such as the second evaluation starting point 524, the third evaluation starting point 526, the fourth evaluation starting point 528 and the fifth evaluation starting point 530. In alternative embodiments, there may be an evaluation starting point at every iteration from the first evaluation starting point 522 to the overfitting point 510.

With each one of the first evaluation starting point 522, the second evaluation starting point 524, the third evaluation starting point 526, the fourth evaluation starting point 528 and the fifth evaluation starting point 530 corresponding to a given training state of the first predictive model 335, the learner 320 may retrain the first predictive model 335 with the new training object 315 to obtain a plurality of retrained first predictive models 535.

The plurality of retrained first predictive models 535 includes a first plurality of retrained first predictive models 537, a second plurality of retrained first predictive models 547, a third plurality of retrained first predictive models 557, a fourth plurality of retrained first predictive models 567 and a fifth plurality of retrained first predictive models 577 beginning respectively at the first evaluation starting point 522, the second evaluation starting point 524, the third evaluation starting point 526, the fourth evaluation starting point 528 and the fifth evaluation starting point 530.

The number of the plurality of retrained first predictive models 535 at each evaluation starting point may be determined such that the number of the plurality of retrained first predictive models 535 is statistically significant, and allows comparing the retrained first predictive model 535 to the plurality of retrained first predictive models 535.

The learner 320 may generate a respective retrained first predictive model prediction error indicator 580 for each of the plurality of retrained first predictive models 535 at each iteration (corresponding to iterations of the first predictive model 335) beginning at the first evaluation starting point 522 and finishing at the overfitting point 510.

The first training procedure 400 and the second training procedure 500 may also be performed using a cross-validation routine (not depicted).

Broadly speaking, cross-validation, also known as rotation estimation, is a model validation technique used for assessing the validity of a predictive model. Generally, the objective of cross-validation is to estimate the accuracy of a predictive model by training the predictive model on a set of training data, and validate the model on a set of verification data, in order to have an accurate predictive model and to limit problems such as overfitting. Non-limiting examples of cross-validation techniques include leave-p-out cross-validation (LpO Cv), leave-one-out cross-validation (LOOCV), k-fold cross-validation, holdout method, Monte Carlo cross-validation, among others.

Cross-validation includes partitioning a sample of data into a plurality of subsets, performing the training of the model on a portion of the subsets (the training sets) and validating the model on another portion of the subsets (the validation or testing sets). To reduce variability, multiple rounds of cross-validation are performed using different partitions, and the validation results are usually averaged over the rounds.

Reference is now made again to FIG. 3. After having generated the plurality of retrained first predictive models 334 (or the plurality of retrained first predictive models 537) from the evaluation starting point 412 (or the plurality of evaluation starting points 520) to the overfitting point 410 (or the overfitting point 510), the respective first prediction error indicator 336 and the respective retrained prediction error indicator 339 (or the respective retrained prediction error indicator 580) for each iteration is received as an input at the prediction error aggregator 340.

The prediction error aggregator 340 processes the prediction error indicators for comparison, during or after the first training procedure 400 (or the second training procedure 500). As a non-limiting example, the respective retrained prediction error indicators 339 (or the respective retrained prediction error indicator 536) may be averaged for each iteration of the plurality of retrained first predictive models 334 (or the plurality of retrained first predictive models 535), and the prediction error aggregator 340 may then generate a vector for each iteration, wherein each row may correspond to the subtraction of the respective average retrained prediction error indicator (not depicted) and the corresponding respective first prediction error indicator 336. The prediction error aggregator 340 may output a set of aggregated prediction error indicators 342. As another non-limiting example, the prediction error aggregator 340 may create pairs for each iteration, each pair comprising the respective first prediction error indicator 336 and the average of the respective retrained prediction error indicator 339 for the iteration (or the average of the respective retrained prediction error indicator 536 for the iteration). Again, as another non-limiting example, the prediction error aggregator 340 may subtract each of the respective retrained prediction error indicator 339 (or the respective retrained prediction error indicator 580) from the respective first prediction error indicator 336 for each iteration to output the set of aggregated prediction error indicator 342.

The set of aggregated prediction error indicators 342 are then processed by the prediction error comparator 350 to compare the performance of the first predictive model 335 and the performance of the plurality of the retrained first predictive models 334 (or the plurality of retrained first predictive models 535) based on the respective first prediction error indicator 336 (or first prediction error indicator 536) and the respective retrained prediction error indicator 339 (or the respective retrained prediction error indicator 580), represented by the set of aggregated prediction error indicators 342.

The MLA 310 may use the prediction error comparator 350 to assess if the new training object 315 improves the predictive ability of the first predictive model 335.

The manner in which the set of aggregated prediction error indicators 342 are compared by the prediction error comparator 350 is not limited. A statistical test may be applied to the set of aggregated prediction error indicators 342 to compare the first predictive model 335 and the retrained first predictive model. As a non-limiting example, a Wilcoxon signed-rank test, a Mann-Whitney-Wilcoxon or a sign test may be used on the aggregated prediction error indicators 342 to assess the predictive ability of the retrained first predictive models with the new training object 315 against the predictive ability of the first predictive model 335.

The prediction error comparator 350 may then output a result of the comparison 354, and thus evaluate if the addition of the new training object 315 improves the performance or predictive ability of the first predictive model 335. If the plurality of retrained first predictive models 334 or 380 outperforms the first predictive model 335 in a statistically significant manner, the search engine server 240 may be updated to include the retrained first predictive model. As it may be understood by a person skilled in the art, the procedure may be executed in parallel for a plurality of features or plurality of training samples of the set of new training objects 315.

Figure 6:
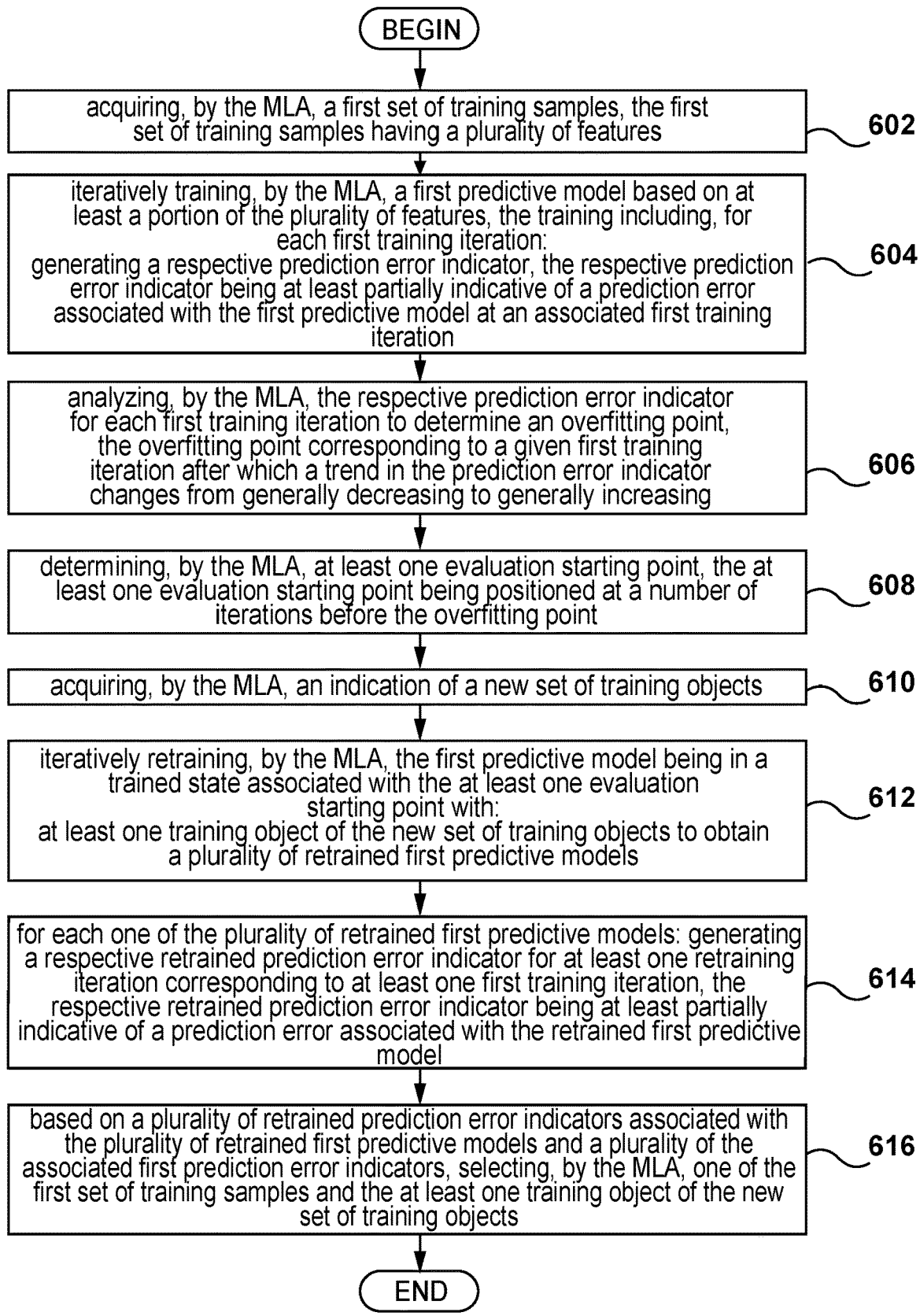
FIG. 6 is a flowchart illustrating the non-limiting implementation of a method for evaluating a new training object in accordance with non-limiting embodiments of the present technology.

Now turning to FIG. 6, a flowchart of a method 600 of evaluating a new training object is illustrated in accordance with non-limiting embodiments of the present technology.

The method 600 may start at step 602.

STEP 602: acquiring, by the MLA, a first set of training samples, the first set of training samples having a plurality of features At step 602, the MLA 310 of the training server 230 may acquire a set of training samples 302 from the first server 220, the set of training samples 302 having a plurality of features, each training sample 308 of the set of training samples 302 having a feature vector 309 and a label 314.

The method 600 may then advance to step 604.

STEP 604: iteratively training, by the MLA, a first predictive model based on at least a portion of the plurality of features, the training including, for each first training iteration:

generating a respective first prediction error indicator, the respective first prediction error indicator being at least partially indicative of a prediction error associated with the first predictive model at an associated first training iteration At step 604, the MLA 310 of the training server 230 may iteratively train, via the learner 320, a first predictive model 335 based on at least a portion of the plurality of features of the set of training samples 302, the training including, for each training iteration, generating a respective first prediction error indicator 336, the respective first prediction error indicator 336 being at least partially indicative of a prediction error associated with the first predictive model 335 at an associated first training iteration. The first predictive model 335 may be generated using a gradient boosting technique for a number of M iterations, with each iteration having a respective first prediction error indicator 336. The method 600 may then advance to step 606.

STEP 606: analyzing, by the MLA, the respective first prediction error indicator for each first training iteration to determine an overfitting point, the overfitting point corresponding to a given first training iteration after which a trend in the first prediction error indicator changes from generally decreasing to generally increasing.

At a step 606, the MLA 310 of the training server 230 may analyze, via the learner 320, the respective first prediction error indicator 336 for each first training iteration to determine an overfitting point 410, the overfitting point 410 corresponding to a given first training iteration after which a trend in the first prediction error indicator 336 changes from generally decreasing to generally increasing. The method 600 may then advance to step 608.

STEP 608: determining, by the MLA, at least one evaluation starting point, the at least one evaluation starting point being positioned at a number of iterations before the overfitting point.

At step 608, the MLA 310 of the training server 230, may determine, via the learner 320, at least one evaluation starting point 412, the at least one being positioned at a number of iterations before the overfitting point. In some embodiments, the MLA 310 may determine, via the learner 320, a plurality of evaluation starting points 520, the plurality of starting points comprising the first evaluation starting point 522, the second evaluation starting point 524, the third evaluation starting point 526, the fourth evaluation starting point 528 and the fifth evaluation starting point 530. The method 600 may then advance to step 610.

STEP 610: acquiring, by the MLA, an indication of a new set of training objects.

At step 610, the MLA 310 of the training server may acquire or receive an indication of a new set of training object 315. The indication of the new set of training objects 315 may be an indication that triggers the MLA 310 to include at least one new training object of the new of set of training objects 315 when training and retraining the first predictive model 335. The new training object 315 may be at least one new feature 317 or a new set of training samples 318. The method 600 may then advance to step 612.

STEP 612: iteratively retraining, by the MLA, the first predictive model being in a trained state associated with the at least one evaluation starting point with:

at least one training object of the new set of training objects to obtain a plurality of retrained first predictive models.

At step 612, the MLA 310 of the training server 230 may iteratively retrain the first predictive model 335 from the evaluation starting point 412 (or each one of the first evaluation starting point 522, the second evaluation starting point 524, the third evaluation starting point 526, the fourth evaluation starting point 528 and the fifth evaluation starting point 530) by including the new feature 317 or the new set of training samples 318. A plurality of retrained first predictive models 334 or 535 may be generated. The method 600 may then advance to step 614.

STEP 614: for each one of the plurality of retrained first predictive models:

generating a respective retrained prediction error indicator for at least one retraining iteration corresponding to at least one first training iteration, the respective retrained prediction error indicator being at least partially indicative of a prediction error associated with the retrained first predictive model.

At step 614, for each one of the plurality of retrained first predictive models 334 or 535, the MLA 310 of the training server 230 may generate a respective retrained prediction error indicator 339 or 580 for at least one retraining iteration corresponding to at least one first training iteration, the respective retrained prediction error indicator 339 or 580 being at least partially indicative of a prediction error associated with the retrained first predictive model. The method 600 may then advance to step 616.

STEP 616: based on a plurality of retrained prediction error indicators associated with the plurality of retrained first predictive models and a plurality of the associated first prediction error indicators, selecting, by the MLA, one of the first set of training samples and the at least one training object of the new set of training objects.

At step 616, based on a plurality of retrained prediction error indicators associated with the plurality of retrained first predictive models and a plurality of the associated first prediction error indicators, selecting, by the MLA, one of the first set of training samples and the at least one training object of the new set of training objects.

The method 600 may then end.

The present technology allows evaluating a new training object, such as a new feature or a new set of training samples, to be added to a predictive model generated by a machine learning algorithm. As it may be apparent from the above description, comparing a plurality of retrained predictive models from at least one evaluation starting point located before the overfitting point associated with a respective trained state may allow assessing the contribution of the new training object to the predictive model. By choosing at least one evaluation interval starting at the evaluation starting point, the present technology provides a balance between evaluating the new training object solely on the overfitting point or the whole set of iterations, therefore allowing determining the contribution of the new training object to the predictive ability of the predictive model with accuracy, while optimizing computational time and computational resources required to execute the evaluation.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

It should be expressly understood that not all technical effects mentioned herein need to be enjoyed in each and every implementation of the present technology. For example, implementations of the present technology may be implemented without the user enjoying some of these technical effects, while other implementations may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A computer-implemented method for training a machine learning algorithm (MLA), the MLA executable by a server, the method comprising:
   acquiring, by the MLA, a first set of training samples, the first set of training samples having a plurality of features;
   iteratively training, by the MLA, a first predictive model based on at least a portion of the plurality of features, the training including, for each first training iteration:
      generating a respective first prediction error indicator, the respective first prediction error indicator being at least partially indicative of a prediction error associated with the first predictive model at an associated first training iteration;
   analyzing, by the MLA, the respective first prediction error indicator for each first training iteration to determine an overfitting point, the overfitting point corresponding to a given first training iteration after which a trend in the first prediction error indicator changes from decreasing to increasing;
   determining, by the MLA, at least one evaluation starting point, the at least one evaluation starting point being positioned at a number of iterations before the overfitting point;
   acquiring, by the MLA, an indication of a new set of training objects;
   iteratively retraining, by the MLA, the first predictive model being in a respective trained state associated with the at least one evaluation starting point with:
      at least one training object of the new set of training objects to obtain a plurality of retrained first predictive models;
   for each one of the plurality of retrained first predictive models:
      generating a respective retrained prediction error indicator for at least one retraining iteration corresponding to at least one first training iteration, the respective retrained prediction error indicator being at least partially indicative of a prediction error associated with the retrained first predictive model;
   based on a plurality of retrained prediction error indicators associated with the plurality of retrained first predictive models and a plurality of the associated first prediction error indicators, selecting, by the MLA, one of the first set of training samples and the at least one training object of the new set of training objects.

2. The method of claim 1, wherein the new set of training objects is one of a new set of features or a new set of training samples.

3. The method of claim 2, wherein the training and the retraining the first predictive model are executed by applying a gradient boosting technique.

4. The method of claim 3, wherein selecting, by the MLA, the at least one training object of the new set of training objects comprises comparing the plurality of retrained prediction error indicators with the plurality of the associated first prediction error indicators by applying a statistical hypothesis test.

5. The method of claim 4 wherein the first prediction error indicator and the respective retrained first predictive model prediction error indicator are one of a mean squared error (MSE) or a mean absolute error (MAE).

6. The method of claim 5, wherein the statistical hypothesis test is a Wilcoxon signed-rank test.

7. The method of claim 6, wherein the at least one evaluation starting point is a plurality of evaluation starting points.

8. The method of claim 7, wherein each one of the plurality of evaluation starting points is associated with a respective plurality of retrained first predictive models.

9. A system for training a machine learning algorithm (MLA), the system comprising:
   a processor;
   a non-transitory computer-readable medium comprising instructions;
   the processor, upon executing the instructions, being configured to:
      acquire, by the MLA, a first set of training samples, the first set of training samples having a plurality of features;
      iteratively train, by the MLA, a first predictive model based on at least a portion of the plurality of features, the training including, for each first training iteration:
         generate a respective first prediction error indicator, the respective first prediction error indicator being at least partially indicative of a prediction error associated with the first predictive model at an associated first training iteration;
      analyze, by the MLA, the respective first prediction error indicator for each first training iteration to determine an overfitting point, the overfitting point corresponding to a given first training iteration after which a trend in the first prediction error indicator changes from decreasing to increasing;
      determine, by the MLA, at least one evaluation starting point, the at least one evaluation starting point being positioned at a number of iterations before the overfitting point;
      acquire, by the MLA, an indication of a new set of training objects;
      iteratively retrain, by the MLA, the first predictive model being in a respective trained state associated with the at least one evaluation starting point with:
         at least one training object of the new set of training objects to obtain a plurality of retrained first predictive models;
      for each one of the plurality of retrained first predictive models:
         generate a respective retrained prediction error indicator for at least one retraining iteration corresponding to at least one first training iteration, the respective retrained prediction error indicator being at least partially indicative of a prediction error associated with the retrained first predictive model;
      based on a plurality of retrained prediction error indicators associated with the plurality of retrained first predictive models and a plurality of the associated first prediction error indicators, select, by the MLA, one of the first set of training samples and the at least one training object of the new set of training objects.

10. The system of claim 9, wherein the new set of training objects is one of a new set of features or a new set of training samples.

11. The system of claim 10, wherein to execute the training and the retraining the first predictive model, the processor is configured to apply a gradient boosting technique.

12. The system of claim 11, wherein to execute the selecting, by the MLA, the at least one training object of the new set of training objects, the processor is configured to compare the plurality of retrained prediction error indicators with the plurality of the associated first prediction error indicators by applying a statistical hypothesis test.

13. The system of claim 12, wherein the first prediction error indicator and the respective retrained prediction error indicator are one of a mean squared error (MSE) or a mean absolute error (MAE).

14. The system of claim 13, wherein the statistical hypothesis test is a Wilcoxon signed-rank test.

15. The system of claim 14, wherein the at least one evaluation starting point is a plurality of evaluation starting points.

16. The system of claim 15, wherein each one of the plurality of evaluation starting points is associated with a respective plurality of retrained first predictive models.

* * * * *